Patented Dec. 4, 1951

2,576,939

UNITED STATES PATENT OFFICE 2,576,939

2,4-DIAMINO-5-PHENYL-6-ALKYL-PYRIMIDINES

George H. Hitchings, Tuckahoe, Peter Byrom Russell, Crestwood, and Elvira A. Falco, New Rochelle, N. Y., assignors to Burroughs Wellcome & Co. (U. S. A.) Inc., Tuckahoe, N. Y., a corporation of New York No Drawing. Application July 20, 1950, Serial No. 175,004

9 Claims. (Cl. 260—256.4)

1

This invention relates to new antimalarial agents and to a method of preparing them.

This application is a continuation in part of our co-pending application Serial Number 168,156 which describes a novel method for the preparation of certain 4-amino-5-arylpyrimidines. It is more particularly an object of the present invention to describe a specific class of those substances which have been found to have outstanding antimalarial properties. The compounds of the present invention may be represented by the formula

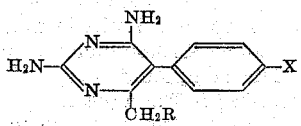

where X is selected from the class consisting of halogen and the nitro radical, and R is selected from the class consisting of hydrogen and alkyl radicals containing from 1 to 4 carbon atoms.

These compositions are prepared by the condensation of an alpha-phenyl-beta-alkoxy-beta-alkylacrylonitrile with guanidine according to the formulas shown below:

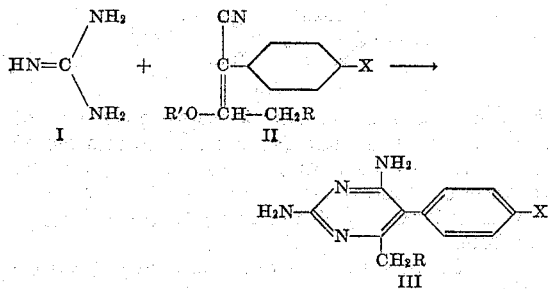

The alpha-phenyl-beta-alkoxy-beta-alkyl-acrylonitriles (II) may be synthesized by the formation of phenylacetonitrile (V) from a selected benzylchloride (IV) followed by treatment with an acyl ester in the presence of an alkali alkoxide to form the corresponding acylnitrile (VI and VIa), as presented by the following equations:

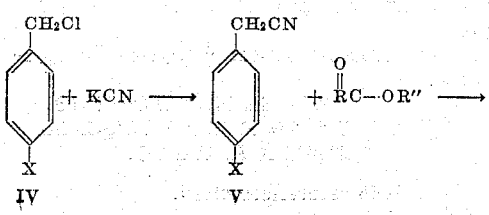

2

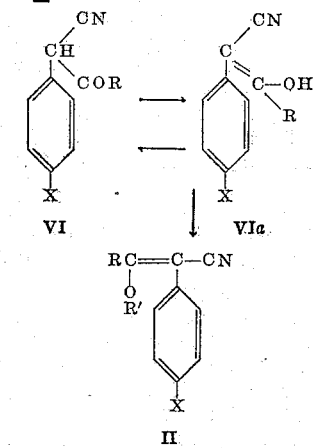

The acylation of the phenylacetonitriles by aliphatic esters as catalyzed by an alkali alkoxide is a reaction well known in the art. The conversion of the acyl derivative into the beta-alkoxy-acrylonitrile (II) may be carried out by any of a number of alkylating agents. However, it is often preferred to treat the acylnitrile (VI, VIa) with diazomethane in ethereal solution. Alternatively the nitrile may be heated with an excess of an orthoester. In either case it is unnecessary to isolate the acrylonitrile; after removal of the excess reagent the residue may be condensed with guanidine to give the desired pyrimidine in good yield. Since the alkyl radicals R′ and R″ are eliminated in subsequent reactions their nature is not considered to be significant and all lower alkyl groups are essentially equivalent.

The following examples illustrate the teachings of the present invention but in no way limit its scope as defined in the claims.

EXAMPLE 1

*2,4-diamino-5-p-chlorophenyl-6-methyl-pyrimidine*

To approximately 9.5 gm. of crude alpha-p-chlorophenyl-beta-methyl-beta-methoxyacrylonitrile (prepared from alpha-acetyl-p-chlorophenylacetonitrile with diazomethane) was added a solution of guanidine in alcohol (prepared by the addition of a solution of 4.6 gm. of guanidine hydrochloride in 50 ml. of ethanol to a solution of 1.2 g. of sodium in 50 ml. of absolute ethanol followed by filtration). The mixture was heated under a reflux condenser for 12 hours on the steam bath. The alcohol was evaporated, and the residue was leached with 5 N sodium hydroxide solution. The solid was dissolved in dilute acetic acid, treated with charcoal, and reprecipitated by the addition of excess sodium hydroxide. The product then was recrystallized from aqueous ethanol. The 2,4-diamino-5-p-chlorophenyl-6-methylpyrimidine melted at 264–5°.

EXAMPLE 2

*2,4-diamino-5-p-chlorophenyl-6-ethylpyrimidine*

An ethereal solution of 15 gm. of alpha-propionyl-p-chlorophenylacetonitrile was treated with diazomethane (from 20 gm. of nitrosomethylurea). After standing overnight the ether and excess diazomethane were removed by evaporation and 50 ml. of ethanol and 100 ml. of an ethanolic solution of guanidine (from 8.1 gm. of guanidine hydrochloride) were added. The solution was refluxed for 5 hours, the alcohol was removed and the residue was extracted with 5 N sodium hydroxide solution. The solid was purified as in Example 1 above and recrystallized from ethanol.

Analysis: Calc'd for $C_{12}H_{13}N_4Cl$: C, 57.9; H, 5.2; N, 22.5. Found: C, 58.0; H, 5.1; N, 22.1. The melting point is 218–220°.

EXAMPLE 3

*2,4-diamino-5-p-chlorophenyl-6-n-propylpyrimidine*

Approximately equimolar amounts of beta-methoxy-beta-n-propyl-alpha-p-chlorophenylacrylonitrile and guanidine were dissolved in ethanol and the solution was refluxed on the steam bath for 12 hours. The product was isolated and purified as above and recrystallized from ethanol. It melted at 171–4°.

EXAMPLE 4

*2,4-diamino-5-p-chlorophenyl-6-isobutylpyrimidine*

Beta-methoxy-beta-isobutyl-alpha-p-chlorophenylacrylonitrile was prepared from isovaleryl-p-chlorophenylacetonitrile with diazomethane and condensed with guanidine in ethanolic solution as above described. The product was isolated and purified as in Examples 1 and 2 above and was recrystallized from benzene. It melted at 147–8°.

EXAMPLE 5

*2,4-diamino-5-p-chlorophenyl-6-n-butylpyrimidine*

The condensation of beta-methoxy-beta-n-butyl-alpha-p-chlorophenylacrylonitrile with guanidine, as above, gave 2,4-diamino-5-p-chlorophenyl-6-n-butylpyrimidine in good yield. After recrystallization from aqueous ethanol the compound melted at 208–10°.

EXAMPLE 6

*2,4-diamino-5-p-chlorophenyl-6-n-amylpyrimidine*

This compound was prepared by the condensation of beta-n-amyl-beta-methoxy-alpha-p-chlorophenylpropionitrile and guanidine, and was isolated in the usual way. After recrystallization from ethanol it formed colorless needles, M. P. 188–90°.

EXAMPLE 7

*2,4-diamino-5-p-nitrophenyl-6-methylpyrimidine*

The condensation of beta-methyl-beta-methoxy-alpha-phenylacrylonitrile with guanidine gave 2,4-diamino-5-phenyl-6-methylpyrimidine in good yield. This pyrimidine (5 g.) was dissolved in concentrated sulfuric acid (40 ml.) and the solution was cooled to −5°. Potassium nitrate (2.5 g.) was added in small portions over the course of 1 hour, with cooling and stirring. After an additional hour the nitration mixture was poured over cracked ice, and the desired nitrophenyl derivative was precipitated by the addition of excess sodium hydroxide. The compound was crystallized by solution in 50% aqueous ethanol by addition of hydrochloric acid followed by precipitation by the addition of sodium hydroxide. It decomposes above 350° but does not melt.

Analysis: Calc'd for $C_{11}H_{11}N_5O_2$: N, 27.5. Found, 28.0.

EXAMPLE 8

*2,4-diamino-5-p-nitrophenyl-6-ethylpyrimidine*

This compound was prepared by nitration of 2,4-diamino-5-phenyl-6-ethylpyrimidine. The preparation of the latter and the nitration followed the procedures set forth in the previous example. The product was crystallized by solution in 50% alcohol containing a slight excess of lactic acid and precipitation on the addition of sodium hydroxide solution. It did not melt when heated to 300°.

EXAMPLE 9

*2,4-diamino-5-p-bromophenyl-6-ethylpyrimidine*

The condensation of beta-ethyl-beta-ethoxy-alpha-p-bromophenylacrylonitrile and guanidine gave 2,4-diamino-p-bromophenylpyrimidine in good yield. The compound was purified by the procedure described in Example 2.

Since the base is the physiologically active moiety in any non-toxic salt of any compound described herein, the known non-toxic salts of these derivatives are regarded as the equivalent of the uncombined bases described in the specification and claims herein.

We claim:

1. A 2,4-diamino-5-phenyl-6-alkylpyrimidine of the formula

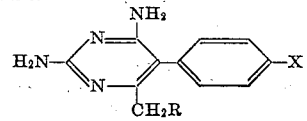

wherein X is selected from the class consisting of halogen and the nitro radical and R is selected from the class consisting of hydrogen and alkyl radicals containing from 1 to 4 carbon atoms.

2. A 2,4-diamino-5-p-chlorophenyl-6-alkylpyrimidine.

3. A 2,4-diamino-5-p-bromophenyl-6-alkylpyrimidine.

4. A 2,4-diamino-5-p-nitrophenyl-6-alkylpyrimidine.

5. 2,4-diamino-5-p-chlorophenyl-6-methylpyrimidine.

6. 2,4-diamino-5-p-chlorophenyl-6-ethylpyrimidine.

7. 2,4-diamino-5-p-nitrophenyl-6-ethylpyrimidine.

8. 2,4-diamino-5-p-bromophenyl-6-ethylpyrimidine.

9. 2,4-diamino-5-p-chlorophenyl-6-n-propylpyrimidine.

GEORGE H. HITCHINGS.
PETER BYROM RUSSELL.
ELVIRA A. FALCO.

No references cited.